United States Patent
Kim et al.

(10) Patent No.: US 10,886,071 B2
(45) Date of Patent: Jan. 5, 2021

(54) ELECTRONIC COMPONENT

(71) Applicant: SAMSUNG ELECTRO-MECHANICS CO., LTD., Suwon-si (KR)

(72) Inventors: Ki Young Kim, Suwon-si (KR); Woo Chui Shin, Suwon-si (KR); Beom Joon Cho, Suwon-si (KR); Sang Soo Park, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 32 days.

(21) Appl. No.: 16/272,752

(22) Filed: Feb. 11, 2019

(65) Prior Publication Data

US 2020/0161056 A1   May 21, 2020

(30) Foreign Application Priority Data

Nov. 16, 2018 (KR) .................. 10-2018-0141894

(51) Int. Cl.
*H01G 4/38* (2006.01)
*H01G 4/232* (2006.01)
(Continued)

(52) U.S. Cl.
CPC .................. *H01G 4/38* (2013.01); *H01G 2/06* (2013.01); *H01G 4/232* (2013.01); *H01G 4/30* (2013.01); *H01G 4/1227* (2013.01)

(58) Field of Classification Search
CPC .......... H01G 4/228; H01G 4/232; H01G 4/30; H01G 4/38
See application file for complete search history.

(56) References Cited

U.S. PATENT DOCUMENTS 7,331,799 B1   2/2008 Lee
9,928,957 B2   3/2018 Park et al.
(Continued)

FOREIGN PATENT DOCUMENTS

JP   11040460 A   *   2/1999
JP   2012164972 A   *   8/2012
(Continued)

OTHER PUBLICATIONS

Korean Office Action dated Jan. 6, 2020 issued in Korean Patent Application No. 10-2018-0141894 (with English translation).

*Primary Examiner* — Eric W Thomas
(74) *Attorney, Agent, or Firm* — Morgan, Lewis & Bockius LLP

(57) ABSTRACT

An electronic component includes a capacitor array having a plurality of multilayer capacitors consecutively arranged in a first direction, the plurality of multilayer capacitors each comprising a body, and first and second external electrodes respectively comprising first and second head portions, and first and second band portions respectively extending from the first and second head portions to portions of upper and lower surfaces and portions of side surfaces of the body, a first metal frame coupled to the plurality of first band portions by binding the first band portions in belt form so as to be connected to the plurality of first external electrodes, and a second metal frame coupled to the plurality of second band portions by binding the second band portions in belt form so as to be connected to the plurality of second external electrodes.

20 Claims, 7 Drawing Sheets

(51) Int. Cl.
*H01G 2/06* (2006.01)
*H01G 4/30* (2006.01)
*H01G 4/12* (2006.01)

(56) References Cited

U.S. PATENT DOCUMENTS

| | | | |
|---|---|---|---|
| 2004/0183147 A1* | 9/2004 | Togashi | H01G 2/065 |
| | | | 257/414 |
| 2013/0343027 A1* | 12/2013 | Perea | H01C 1/14 |
| | | | 361/813 |
| 2014/0160624 A1* | 6/2014 | McConnell | H01G 4/38 |
| | | | 361/301.4 |
| 2015/0131202 A1 | 5/2015 | Masuda et al. | |
| 2017/0162334 A1 | 6/2017 | Ra et al. | |
| 2017/0169956 A1* | 6/2017 | Miller | H01G 4/40 |

FOREIGN PATENT DOCUMENTS

| | | |
|---|---|---|
| JP | 2015-073038 A | 4/2015 |
| JP | 6372067 B2 | 7/2018 |
| KR | 10-2016-0139409 A | 12/2016 |
| KR | 10-2017-0066019 A | 6/2017 |

* cited by examiner

ELECTRONIC COMPONENT

CROSS-REFERENCE TO RELATED APPLICATION(S)

This application claims the benefit of priority to Korean Patent Application No. 10-2018-0141894 filed on Nov. 16, 2018 in the Korean Intellectual Property Office, the disclosure of which is incorporated herein by reference in its entirety.

TECHNICAL FIELD

The present disclosure relates to an electronic component.

BACKGROUND

A multilayer capacitor has been used in a variety of electronic devices as it is relatively small in size and is able to implement high capacity.

Recently, with the development of eco-friendly vehicles and electrical vehicles, a greater number of power driving systems have been used in vehicles, and there has been increased demand for a multilayer capacitor for vehicles.

To be used as a component for vehicles, a multilayer capacitor is required to have higher level of thermal reliability, electrical reliability, and mechanical reliability. Accordingly, performance of a multilayer capacitor has advanced.

Particularly, there has been increased demand for a module type electronic component having improved durability against vibrations and deformation while implementing high capacitance by stacking a plurality of multilayer capacitors in a limited space.

SUMMARY

An aspect of the present disclosure is to provide an electronic component capable of implementing high capacitance, having improved durability and reliability against vibrations and deformation, and preventing separation between a multilayer capacitor and a metal frame, even when the electronic component is manufactured in module form.

According to an aspect of the present disclosure, an electronic component includes a capacitor array having a plurality of multilayer capacitors consecutively arranged in a vertical direction, the plurality of multilayer capacitors each comprising a body, and first and second external electrodes respectively comprising first and second head portions respectively disposed on both end surfaces of the body in a length direction perpendicular to the vertical direction, and first and second band portions respectively extending to cover portions of upper and lower surfaces and portions of side surfaces of the body, in which the upper, lower, and side surfaces of the body are different from the end surfaces of the body; a first metal frame coupled to the first band portions of the plurality of multilayer capacitors by binding the first band portions in a belt form so as to be connected to the first external electrodes; and a second metal frame coupled to the second band portions by binding the second band portions of the plurality of multilayer capacitors in a belt form so as to be connected to the second external electrodes.

The first band portions may have portions on which the first metal frame is not disposed in the length direction, and the second band portions may have portions on which the second metal frame is not disposed in the length direction.

The first and second metal frames may be coupled to the first and second band portions in a line-contact form.

The first and second metal frames may be coupled to the first and second band portions in a face-contact form.

The first and second metal frames may further include first and second lead portions, respectively, each extending towards a mounting surface.

The first and second metal frames may be mounted on a substrate on the mounting surface, and end portions of the first and second lead portions of the first and second metal frames may be respectively connected to first and second external terminals of the substrate. The capacitor array may be separated from the substrate by a predetermined gap.

The ratio of a to b may satisfy $0.4 \leq a/b \leq 1.0$, where a dimension of each of the first and second metal frames in the length direction is defined as "a", and a dimension of each of the first and second band portions in the length direction is defined as "b".

First and second conductive contact layers may be respectively interposed between the first band portions and the first metal frame and between the second band portions and the second metal frame.

The first and second conductive contact layers may be made of a high-temperature solder or a conductive adhesive.

The body may include a dielectric layer and a plurality of first and second internal electrodes alternately disposed with the dielectric layer interposed therebetween.

According to another aspect of the present disclosure, an electronic component includes a capacitor array having a plurality of multilayer capacitors consecutively arranged in two directions, which are a vertical direction and a width direction, the plurality of multilayer capacitors each comprising a body, and first and second external electrodes respectively comprising first and second head portions respectively disposed on both end surfaces of the body in a length direction, and first and second band portions respectively extending to cover portions of upper and lower surfaces and portions of side surfaces of the body, in which the upper, lower, and side surfaces of the body are different from the end surfaces of the body, and the vertical, width, and length directions are orthogonal to each other; a first metal frame coupled to the first band portions of the plurality of multilayer capacitors by binding the first band portions in a belt form so as to be connected to the first external electrodes; and a second metal frame coupled to the second band portions by binding the second band portions of the plurality of multilayer capacitors in a belt form so as to be connected to the second external electrodes.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Figure 1:
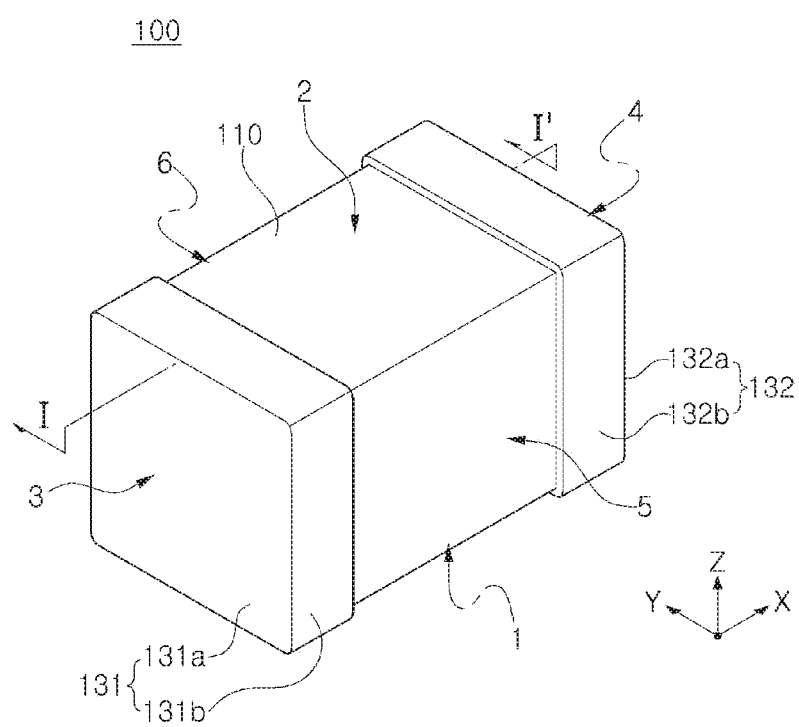
FIG. 1 is a schematic perspective diagram illustrating a multilayer capacitor according to an exemplary embodiment in the present disclosure.

Hereinafter, embodiments of the present disclosure will be described as follows with reference to the attached drawings.

The present disclosure may, however, be exemplified in many different forms and should not be construed as being limited to the specific embodiments set forth herein.

Rather, these embodiments are provided so that this disclosure will be thorough and complete, and will fully convey the scope of the disclosure to those skilled in the art.

Accordingly, shapes and sizes of elements in the drawings may be exaggerated for clarity of description, and elements indicated by the same reference numeral are same elements in the drawings.

Further, throughout the specification, it will be understood that when a portion "includes" an element, it can further include another element, not excluding another element, unless otherwise indicated.

In the exemplary embodiment, an X direction, a Y direction, and a Z direction in the drawings may indicate a length direction, a width direction, and a vertical direction of a multilayer capacitor, respectively.

Also, an X direction, a Y direction, and a Z direction may indicate a width direction, a length direction, and a vertical direction of a capacitor array, respectively.

A Y direction may be the same as a layering direction in which the dielectric layers are layered.

Figure 2A:
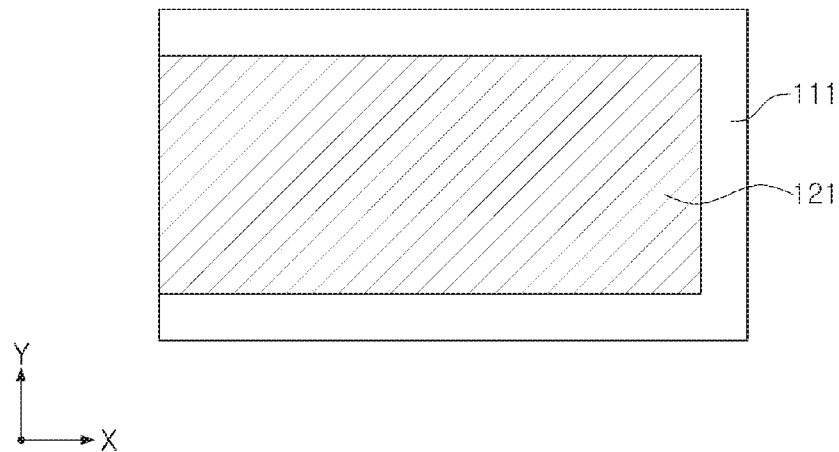
FIGS. 2A and 2B are plan views illustrating first and second internal electrodes applied in a multilayer capacitor in FIG. 1.
Figure 2B:
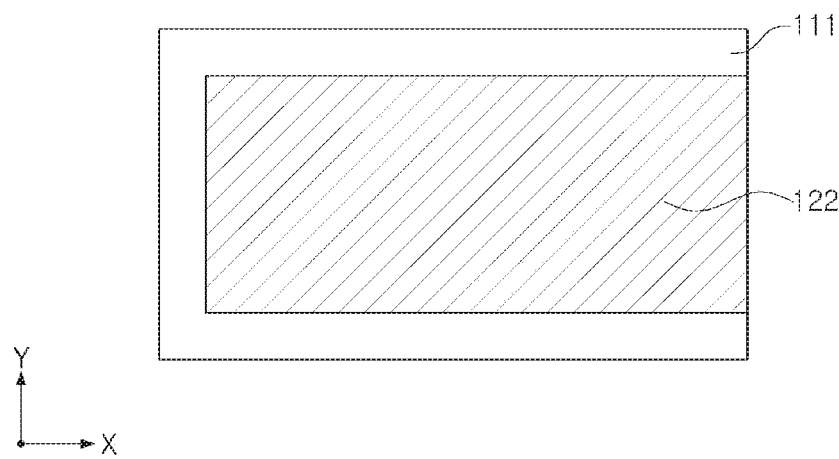
Figure 3:
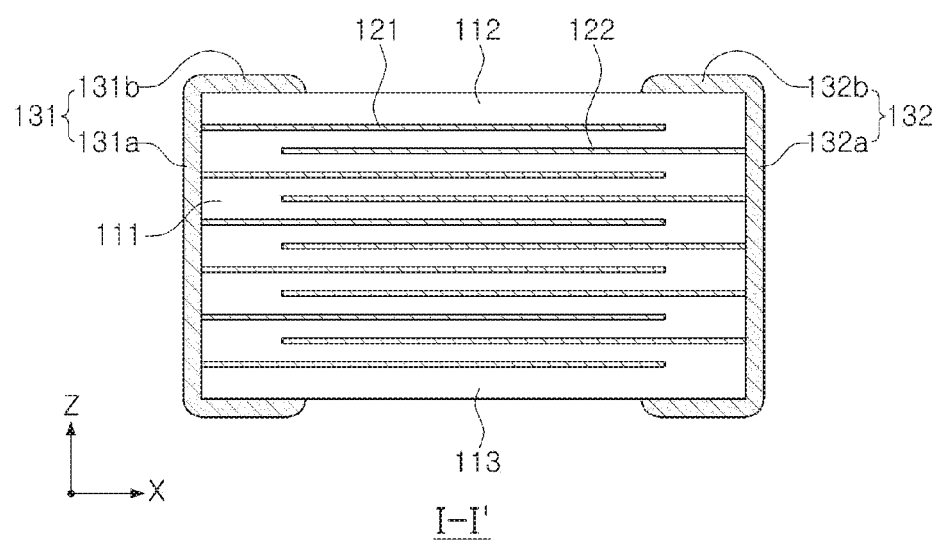
FIG. 3 is a cross-sectional diagram taken along line I-I' in FIG. 1.

FIG. 1 is a schematic perspective diagram illustrating a multilayer capacitor according to an exemplary embodiment. FIGS. 2A and 2B are plan views illustrating first and second internal electrodes applied in a multilayer capacitor illustrated in FIG. 1. FIG. 3 is a cross-sectional diagram taken along line I-I' in FIG. 1.

In the description below, a structure of a multilayer capacitor applied in an electronic component according to the exemplary embodiment will be described with reference to FIGS. 1 to 3.

Referring to FIGS. 1 to 3, a multilayer capacitor 100 according to an exemplary embodiment may include a body 110, and first and second external electrodes 131 and 132 respectively formed on both ends of the body 110 in an X direction.

The body 110 may be disposed by layering a plurality of dielectric layers 111 in a Z direction and through a sintering process, and the dielectric layers 111 of the capacitor body 110 may be integrated such that boundaries between adjacent dielectric layers 111 may be difficult to identify without using a scanning electron microscope (SEM).

Also, the body 110 may include a plurality of the dielectric layers 111, and first and second internal electrodes 121 and 122 alternately disposed with the dielectric layer 111 interposed therebetween and having different polarities.

Also, the body 110 may also include an active area, a portion contributing to forming capacitance of the capacitor, and cover portions 112 and 113 arranged in right and left portions of the active area in a Z direction, and upper and lower portions of the active area in a Z direction, respectively, as margin portions.

The shape of the body 110 may not be limited to any particular shape. For example, the body 110 may have a hexahedral shape. The body 110 may also include first and second surfaces 1 and 2 opposing each other in a Z direction, third and fourth surfaces 3 and 4 connected to the first and second surfaces 1 and 2 and opposing each other in X direction, and fifth and sixth surfaces 5 and 6 connected to the first and second surfaces 1 and 2 and the third and fourth surfaces 3 and 4, and opposing each other.

The dielectric layer 111 may include a ceramic powder. For example, the dielectric layer 111 may include a $BaTiO_3$ ceramic powder, and the like.

The $BaTiO_3$ ceramic powder may be a powder formed by partially employing Ca or Zr in $BaTiO_3$, such as $(Ba_{1-x}Ca_x)TiO_3$, $Ba(Ti_{1-y}Ca_y)O_3$, $(Ba_{1-x}Ca_x)(Ti_{1-y}Zr_y)O_3$ or $Ba(Ti_{1-y}Zr_y)O_3$, but the $BaTiO_3$ ceramic powder is not limited thereto.

Also, the dielectric layer 111 may further include ceramic additives, organic solvents, plasticizers, coupling agents, dispersing agents, and the like, in addition to the ceramic powder.

As the ceramic additive, transition metal oxides or transition metal carbides, rare earth elements, magnesium (Mg), aluminum (Al), and the like, may be used.

The first and second internal electrodes 121 and 122 may be configured to have different polarities, and may be disposed on the dielectric layer 111 and layered in a Z direction. The first and second internal electrodes 121 and 122 may be alternately disposed with a single dielectric layer 111 interposed therebetween to oppose each other in a Z direction in the body 110.

In this case, the first and second internal electrodes 121 and 122 may be electrically insulated from each other by the dielectric layer 111 interposed therebetween.

The diagrams illustrate a structure in which the internal electrodes are layered in a Z direction, but the structure is not limited thereto. If desired, the exemplary embodiment may also be applied to a structure in which internal electrodes are layered in a Y direction.

One ends of the first and second internal electrodes 121 and 122 may be exposed through the third and fourth surfaces 3 and 4 of the body 110.

The end portions of the first and second internal electrodes 121 and 122 alternately exposed through the third and fourth surfaces 3 and 4 of the body 110 may be electrically connected to the first and second external electrodes 131 and 132 disposed on both ends of the body 110 in an X direction.

By the configuration as above, when a predetermined voltage is applied to the first and second external electrodes 131 and 132, an electric charge may be accumulated between the first and second internal electrodes 121 and 122.

In this case, the capacitance of the multilayer capacitor 100 may be proportionate to an area of overlap between the first and second internal electrodes 121 and 122, which overlap each other in a Z direction in the active area.

A material forming the first and second internal electrodes 121 and 122 may not be limited to any particular material, and may be formed of a conductive paste comprised of more than one materials among noble metals such as palladium (Pd), a palladium-silver (Pd—Ag) alloy, and the like, and nickel (Ni) and copper (Cu), for example.

As the method of printing a conductive paste, a screen printing method, a gravure printing method, or the like, may be used, but the method of printing is not limited thereto.

The first and second external electrodes 131 and 132 may be provided with voltages having different polarities, may be disposed on both ends of the body 110 in an X direction, and may be electrically connected to the exposed end portions of the first and second internal electrodes 121 and 122, respectively.

The first external electrode 131 may include a first head portion 131a and a first band portion 131b.

The first head portion 131a may be disposed on the third surface 3 of the body 110, may be in contact with an end portion of the first internal electrode 121 exposed externally through the third surface 3 of the body 110, and may electrically connect the first internal electrode 121 and the first external electrode 131 to each other.

The first band portion 131b may be a portion extending to portions of the first, second, fifth, and sixth surfaces 1, 2, 5 and 6 of the body 110 from the first head portion 131a to improve adhesion force, or for other purposes.

The second external electrode 132 may include a second head portion 132a and a second band portion 132b.

The second head portion 132a may be disposed on the fourth surface 4 of the body 110, may be in contact with a portion of the second internal electrode 122 externally exposed through the fourth surface 4 of the body 110, and may electrically connect the second internal electrode 122 and the second external electrode 132 to each other.

The second band portion 132b may be a portion extending to portions of the first, second, fifth, and sixth surfaces 1, 2, 5 and 6 of the body 110 from the second head portion 132a to improve adhesion force, or for other purposes.

The first and second external electrodes 131 and 132 may further include a plating layer.

The plating layer may include first and second nickel (Ni) plating layers, and first and second tin (Sn) plating layers respectively covering the first and second nickel (Ni) plating layers.

Figure 4:
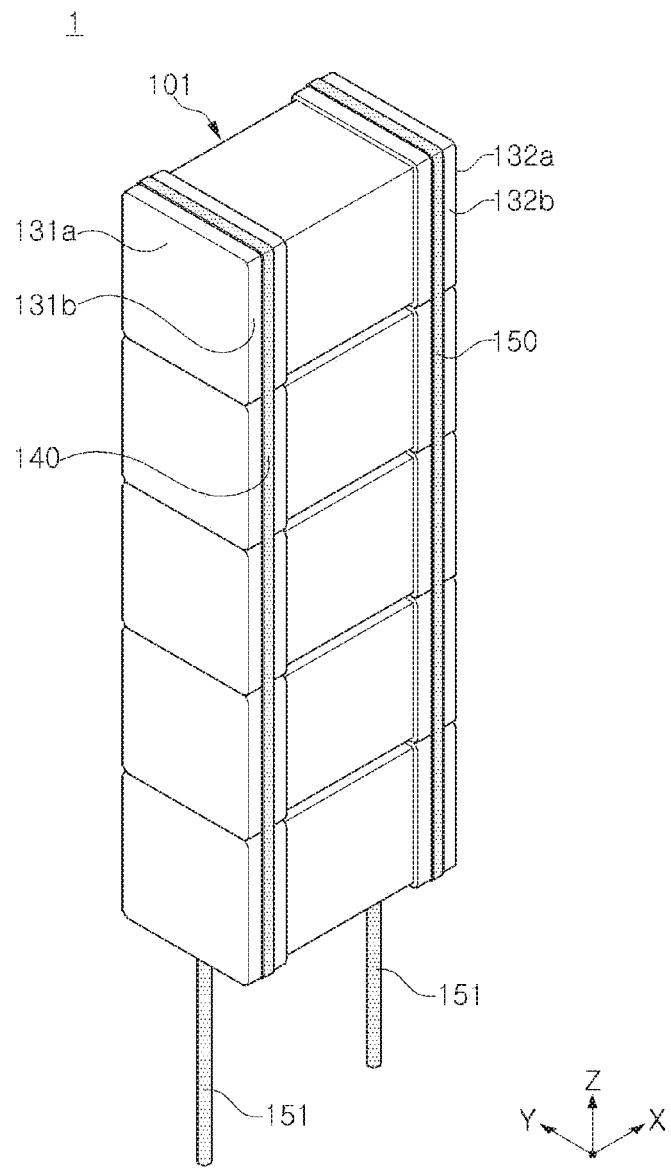
FIG. 4 is a perspective diagram illustrating a structure of an electronic component according to an exemplary embodiment in the present disclosure.
Figure 5:
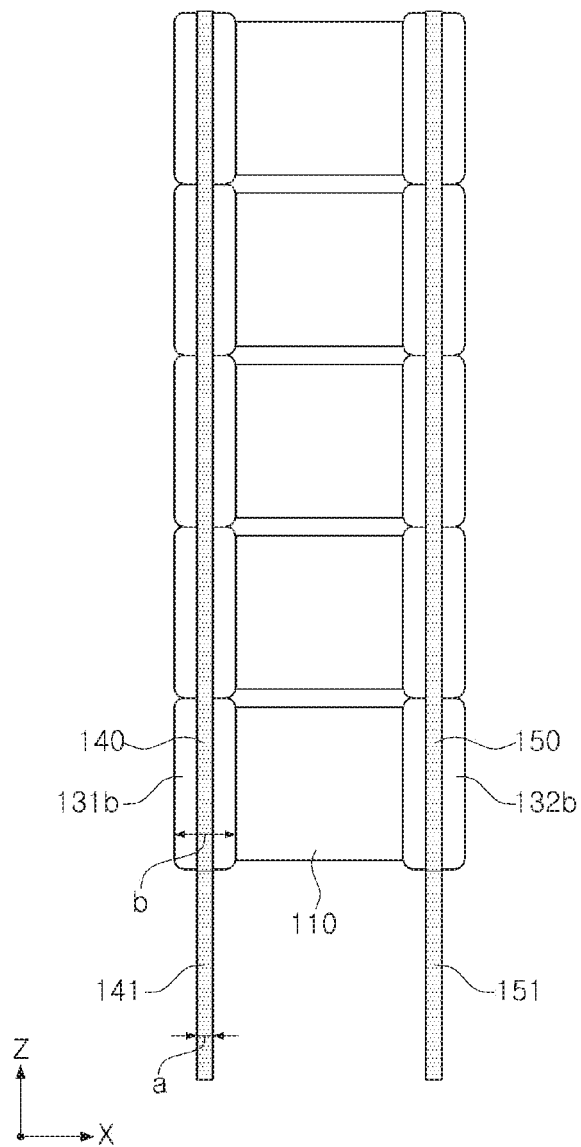
FIG. 5 is a diagram illustrating a front view of FIG. 4.

FIG. 4 is a schematic perspective diagram illustrating a structure of an electronic component according to an exemplary embodiment. FIG. 5 is a diagram illustrating a front view of FIG. 4.

Referring to FIGS. 4 and 5, an electronic component 1 according to an exemplary embodiment may include a capacitor array 101 including a plurality of multilayer capacitors 100 consecutively arranged in a Z direction, a vertical direction, and first and second metal frames 140 and 150.

Figure 7:
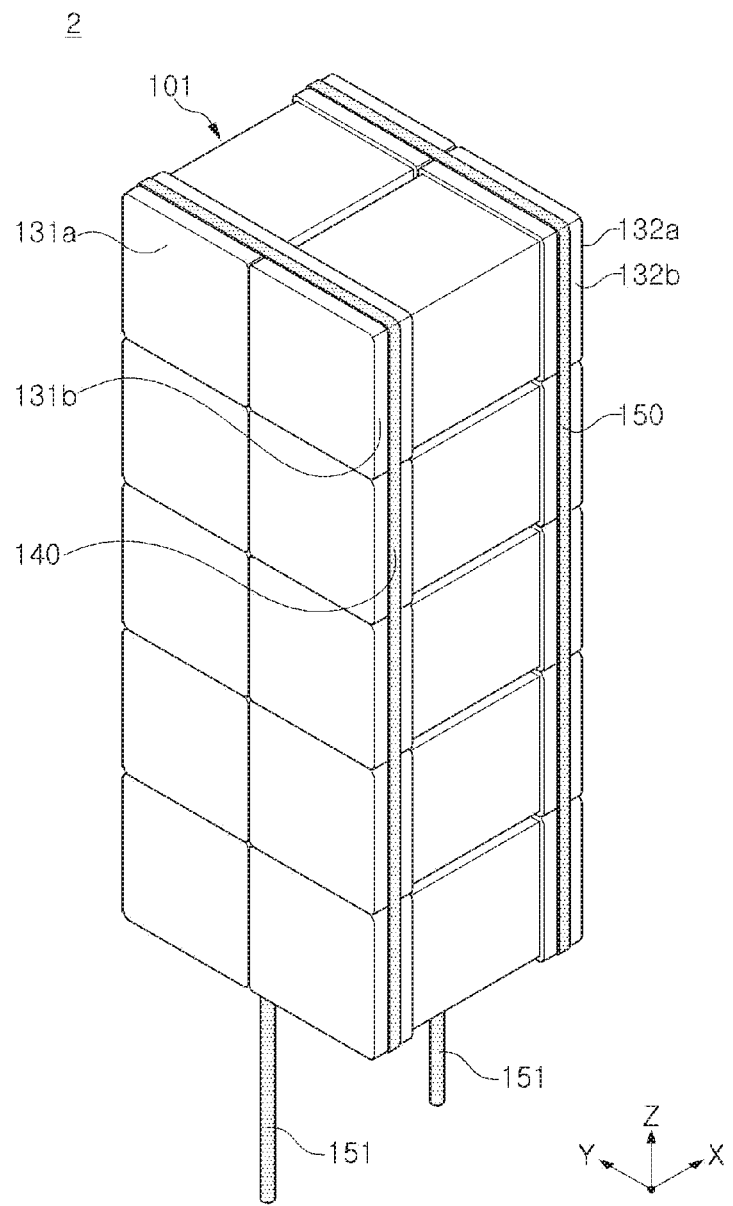
FIG. 7 is a perspective diagram illustrating a structure of an electronic component according to another exemplary embodiment in the present disclosure.

FIG. 7 is a schematic perspective diagram illustrating a structure of an electronic component according to another exemplary embodiment. Referring to FIG. 7, an electronic component 2 according to another exemplary embodiment may include a capacitor array 101 including a plurality of multilayer capacitors 100 consecutively arranged in two directions, which are the X and Z directions.

The first metal frame 140 may be coupled to a first band portion 131b of each of a plurality of first external electrodes 131 of the plurality of multilayer capacitors 100 by binding the first band portion 131b in a belt form and may be connected to the plurality of first external electrodes 131, and may serve as a common electrode electrically and physically connecting adjacent first external electrodes 131 to each other.

In this case, a first conductive contact layer (not illustrated) may be disposed between the first band portions 131b of the plurality of first external electrodes 131 and the first metal frame 140.

The first conductive contact layer may be formed of a high-temperature solder, a conductive adhesive, or the like, but a material of the first conductive contact layer is not limited thereto.

The second metal frame 150 may be coupled to a second band portion 132b of each of a plurality of second external electrodes 132 of the plurality of multilayer capacitors 100 by binding the second band portion 132b in a belt form and may be connected to the plurality of second external electrodes 132, and may serve as a common electrode electrically and physically connecting adjacent second external electrodes 132.

In this case, a second conductive contact layer (not illustrated) may be disposed between the second band portions 132b of the plurality of second external electrodes 132 and the second metal frame 150.

The second conductive contact layer may be formed of a high-temperature solder, a conductive adhesive, or the like, but a material of the first conductive contact layer is not limited thereto.

In this case, the plurality of first band portions 131b may have portions in which the first metal frame 140 is not disposed on both side portions of the first band portions 131b in an X direction, and the plurality of second band portions 132b may have portions in which the second metal frame 150 is not disposed on both side portions of the second band portions 132b in an X direction.

In other words, the first and second metal frames may be coupled to the first and second band portions in a line-contact form.

Also, in the exemplary embodiment, adhesion force may change in accordance with a ratio of an area in which the metal frame and the band portion are in contact with each other.

As illustrated in FIG. 5, when a width between the first and second metal frames is defined as a, and a width between the first and second band portions is defined as b, a and b may satisfy $0.4 \leq a/b \leq 1.0$.

In this case, when a/b is 1.0, the first band portions 131b may not have portions in which the first metal frame 140 is not disposed on both side portions of the first band portions 131b in an X direction, and the second band portions 132b may not have portions in which the second metal frame 150 is not disposed on both side portions of the second band portions 132b in an X direction.

In other words, when a/b is 1.0, the first and second metal frames may be coupled to the first and second band portions in face-contact form.

Figure 6:
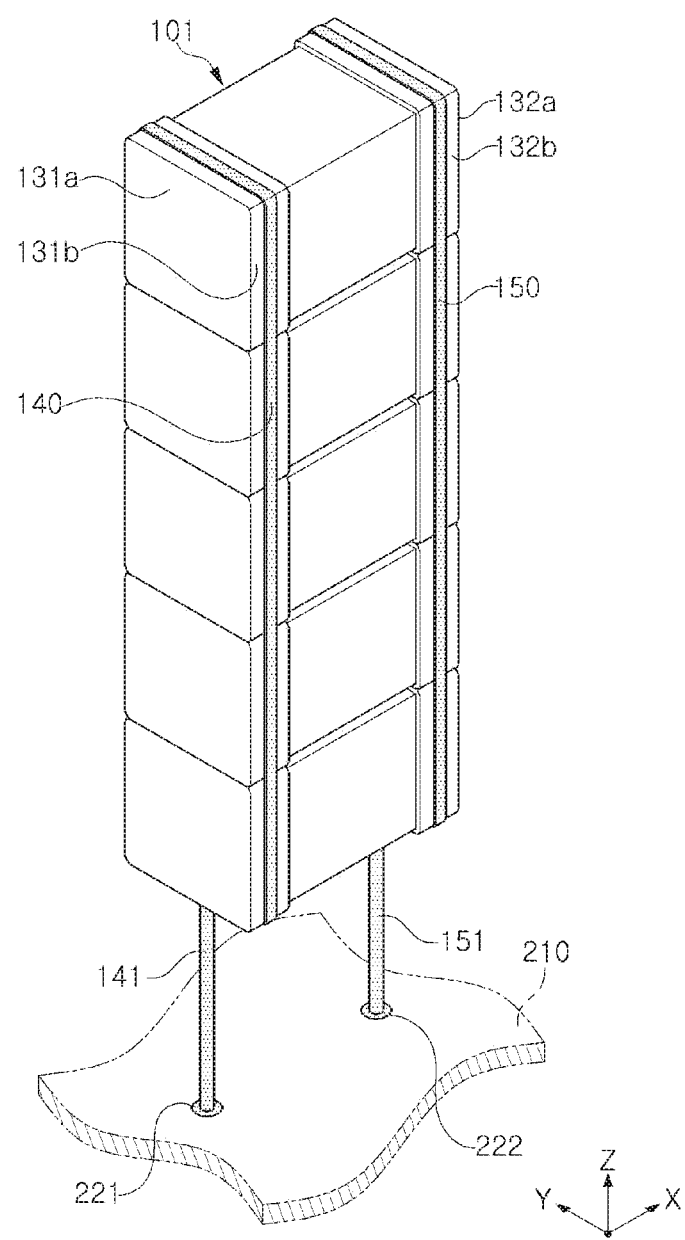
FIG. 6 is a schematic perspective diagram illustrating a state in which an electronic component is mounted on a substrate.

As illustrated in FIG. 6, the first and second metal frames 140 and 150 may respectively further include first and second lead portions 141 and 151 which may extend towards a mounting surface and may respectively be connected to first and second external terminals 221 and 222 of the substrate 210.

A general multilayer capacitor may have a structure in which a capacitor body is directly in contact with a substrate by a solder when being mounted on a substrate, and heat or mechanical deformation generated from a substrate may be directly delivered to a multilayer capacitor. Accordingly, it may be difficult to secure high level of reliability.

With regard to an electronic component 1 according to the exemplary embodiment, the electronic component 1 has a capacitor array 101 in which a plurality of multilayer capacitors 100 are arranged in integrated form, such that high capacitance may be implemented, and first and second metal frames 140 and 150 may respectively be coupled to a plurality of first and second band portions 131b and 132b of first and second external electrodes 131 and 132 of the capacitor array 101, such that a gap between the capacitor array 101 and a substrate may be secured. Accordingly, when the electronic component 1 is mounted on a substrate, stress from the substrate may not be directly delivered to the multilayer capacitors 100, thereby improving thermal reliability, mechanical reliability, and warpage tolerance.

In the case of an electronic component including a capacitor array with vertically stacked multilayer capacitors to implement high capacitance in a limited space as in the prior art, the plurality of multilayer capacitors may be coupled to one another using a metal frame. However, as the metal frame is coupled to a head portion of an external electrode of the multilayer capacitor, adhesion force may be weak, and there may be a defect in which the multilayer capacitors are separated from one another after the electronic component is mounted.

In the case of the electronic component 1 according to the exemplary embodiment, the first metal frame 140 may be coupled to the plurality of first band portions 131b of the plurality of first external electrodes 150 by binding the first band portions 131b in a belt form, rather than being coupled to the first head portion 131a, and the second metal frame 150 may be coupled to the plurality of second band portions 132b of the plurality of second external electrodes 132 by binding the second band portions 132b in a belt form, rather than being coupled to the second head portion 132a. Accordingly, a phenomenon in which the multilayer capacitors 100 are separated from the first and second metal frames 140 and 150 may be reduced, thereby improving adhesion reliability of the electronic component 1.

Table 1 below indicates changes in adhesion force in accordance with a ratio of an area in which a metal frame is in contact with a band portion.

In the table below, "a" may be a width of each of first and second metal frames, and "b" may be a width of each of first and second band portions.

An electronic component used in the experiment was configured such that three multilayer capacitors were stacked in a Z direction, and the band portions of the external electrode and the metal frame were coupled to each other while varying a value of a/b, a ratio of an area in which the band portion and the metal frame were in contact with each other. Then, the electronic component was dropped from heights of 0.5 m and 1 m, and whether the multilayer capacitors were separated from the metal frame was observed. The results of the above described experiment are indicated in Table 1 below.

TABLE 1

|  |  | # | | | | |
| --- | --- | --- | --- | --- | --- | --- |
|  |  | 1 | 2 | 3 | 4 | 5 |
|  |  | a/b | | | | |
|  |  | 0.3 | 0.4 | 0.6 | 0.8 | 1.2 |
| Dropping Height | 0.5M | 0 EA | 0 EA | 0 EA | 0 EA | 0 EA |
|  | 1M | 2 EA | 0 EA | 0 EA | 0 EA | 0 EA |

Referring to FIG. 1, in sample 1 in which a/b was 0.3, a defect did not occur when the electronic component was dropped from a height of 0.5 m, but a defect occurred when the electronic component was dropped from a height of 1 m. However, in samples 2 to 5 in which a/b was 0.4 or higher, a defect did not occur.

Generally, even when a ratio between a band portion of an external electrode and a metal frame is 1.0 or higher, a contact area between the band portion of the external electrode and the metal frame may not increase higher than 1.0. Thus, a desirable range of a/b may be $0.4 \leq a/b \leq 1.0$.

According to the aforementioned exemplary embodiment, the metal frame may be coupled to the band portion of the external electrode by binding the band portion, rather than being coupled to a head portion of the external electrode, thereby improving mounting stability when the electronic component is mounted on a substrate, and the like.

Also, according to the aforementioned exemplary embodiment, an electronic component having high capacitance may be provided, thermal reliability, mechanical reliability, and warpage tolerance of the electronic component may improve. Further, even when the electronic component includes a plurality of vertically stacked multilayer capacitors, the separation of the multilayer capacitors from the metal frame may be prevented.

While the exemplary embodiments have been shown and described above, it will be apparent to those skilled in the art that modifications and variations could be made without departing from the scope of the present invention as defined by the appended claims.

What is claimed is:

1. An electronic component, comprising:
   a capacitor array having a plurality of multilayer capacitors consecutively arranged in a vertical direction, the plurality of multilayer capacitors each comprising a body, and first and second external electrodes respectively comprising first and second head portions respectively disposed on both end surfaces of the body in a length direction perpendicular to the vertical direction, and first and second band portions respectively extending in the length direction to cover portions of upper and lower surfaces and portions of side surfaces of the body, wherein the upper, lower, and side surfaces of the body are different from the end surfaces of the body;
   a first metal frame coupled to the first band portions of the plurality of multilayer capacitors by binding the first band portions in a belt form so as to be connected to the first external electrodes; and
   a second metal frame coupled to the second band portions of the plurality of multilayer capacitors by binding the second band portions in a belt form so as to be connected to the second external electrodes,
   wherein the first and second metal frames respectively include first portions extending onto respective bottom surfaces of the first and second band portions, the bottom surfaces facing a mounting surface in the vertical direction, and
   the first and second metal frames further comprise first and second lead portions, respectively, protruding from the respective first portions and extending towards the mounting surface.

2. The electronic component of claim 1, wherein the first band portions have portions on which the first metal frame is not disposed in the length direction, and the second band portions have portions on which the second metal frame is not disposed in the length direction.

3. The electronic component of claim 1, wherein the first and second metal frames are coupled to the first and second band portions in a line-contact form.

4. The electronic component of claim 1, wherein the first and second metal frames are coupled to the first and second band portions in a face-contact form.

5. The electronic component of claim 1, wherein the first and second metal frames are mounted on a substrate on the mounting surface, and end portions of the first and second lead portions of the first and second metal frames are respectively connected to first and second external terminals of the substrate, wherein the capacitor array is separated from the substrate by a predetermined gap.

6. The electronic component of claim 1, wherein the ratio of a to b satisfies $0.4 \leq a/b \leq 1.0$, where a width of each of the first and second metal frames is defined as "a", and a width of each of the first and second band portions is defined as "b".

7. The electronic component of claim 1, wherein first and second conductive contact layers are respectively interposed between the first band portions and the first metal frame and between the second band portions and the second metal frame.

8. The electronic component of claim 7, wherein the first and second conductive contact layers are made of a high-temperature solder or a conductive adhesive.

9. The electronic component of claim 1, wherein the body comprises a dielectric layer and a plurality of first and second internal electrodes alternately disposed with the dielectric layer interposed therebetween.

10. An electronic component, comprising:
a capacitor array having a plurality of multilayer capacitors consecutively arranged in two directions, which are a vertical direction and a width direction, the plurality of multilayer capacitors each comprising a body, and first and second external electrodes respectively comprising first and second head portions respectively disposed on both end surfaces of the body in a length direction, and first and second band portions respectively extending in the length direction to cover portions of upper and lower surfaces and portions of side surfaces of the body, wherein the upper, lower, and side surfaces of the body are different from the end surfaces of the body, and the vertical, width, and length directions are orthogonal to each other;
a first metal frame coupled to the first band portions of the plurality of multilayer capacitors by binding the first band portions in a belt form so as to be connected to the first external electrodes; and
a second metal frame coupled to the second band portions of the plurality of multilayer capacitors by binding the second band portions in a belt form so as to be connected to the second external electrodes,
wherein the first and second metal frames respectively include first portions extending onto respective bottom surfaces of the first and second band portions, the bottom surfaces facing a mounting surface in the vertical direction, and
the first and second metal frames further comprise first and second lead portions, respectively, protruding from the respective first portions and extending towards the mounting surface.

11. The electronic component of claim 10, wherein the first band portions have portions on which the first metal frame is not disposed in the length direction, and the second band portions have portions on which the second metal frame is not disposed in the length direction.

12. The electronic component of claim 10, wherein the first and second metal frames are coupled to the first and second band portions in a line-contact form.

13. The electronic component of claim 10, wherein the first and second metal frames are coupled to the first and second band portions in a face-contact form.

14. The electronic component of claim 10, wherein the first and second metal frames are mounted on a substrate on the mounting surface, and end portions of the first and second lead portions of the first and second metal frames are respectively connected to first and second external terminals of the substrate, wherein the capacitor array is separated from the substrate by a predetermined gap.

15. The electronic component of claim 10, wherein the ratio of a to b satisfies $0.4 \leq a/b \leq 1.0$, where a width of each of the first and second metal frames is defined as "a", and a width of each of the first and second band portions is defined as "b".

16. The electronic component of claim 10, wherein first and second conductive contact layers are respectively interposed between the first band portions and the first metal frame and between the second band portions and the second metal frame.

17. The electronic component of claim 16, wherein the first and second conductive contact layers are made of a high-temperature solder or a conductive adhesive.

18. The electronic component of claim 10, wherein the body comprises a dielectric layer and a plurality of first and second internal electrodes alternately disposed with the dielectric layer interposed therebetween.

19. An electronic component, comprising:
a capacitor array having a plurality of multilayer capacitors consecutively arranged in a vertical direction, the plurality of multilayer capacitors each comprising a body, and first and second external electrodes respectively comprising first and second head portions respectively disposed on both end surfaces of the body in a length direction perpendicular to the vertical direction, and first and second band portions respectively extending in the length direction to cover portions of upper and lower surfaces and portions of side surfaces of the body, wherein the upper, lower, and side surfaces of the body are different from the end surfaces of the body;
a first metal frame coupled to the first band portions of the plurality of multilayer capacitors by binding the first band portions in a belt form so as to be connected to the first external electrodes; and
a second metal frame coupled to the second band portions of the plurality of multilayer capacitors by binding the second band portions in a belt form so as to be connected to the second external electrodes,
wherein portions of each of the first and second metal frames are disposed on two opposing side surfaces of a respective one of the first and second band portions in a width direction perpendicular to the vertical and length directions, and
the first and second metal frames are spaced apart from the first and second head portions, respectively, in the length direction.

20. The electronic component of claim 19, wherein the first and second metal frames are spaced apart from respective innermost ends of the first and second band portions, respectively, in the length direction.

* * * * *